(12) United States Patent
Kaiho

(10) Patent No.: US 6,771,917 B2
(45) Date of Patent: Aug. 3, 2004

(54) IMAGE FORMING APPARATUS HAVING AN AIR OPENING IN A PAPER DISCHARGE AREA

(75) Inventor: Satoshi Kaiho, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/434,274

(22) Filed: May 9, 2003

(65) Prior Publication Data

US 2003/0206747 A1 Nov. 6, 2003

Related U.S. Application Data

(63) Continuation of application No. 10/198,132, filed on Jul. 19, 2002, now Pat. No. 6,611,667, which is a continuation of application No. 09/738,323, filed on Dec. 18, 2000, now Pat. No. 6,438,339.

(51) Int. Cl.[7] .............................................. G03G 21/20
(52) U.S. Cl. ........................................ 399/92; 399/405
(58) Field of Search ........................... 399/92, 405, 305

(56) References Cited

U.S. PATENT DOCUMENTS

| | | | |
|---|---|---|---|
| 4,695,151 A | | 9/1987 | Watanabe |
| 5,218,411 A | * | 6/1993 | Kosugiyama et al. |
| 5,300,981 A | | 4/1994 | Shioya |
| 5,860,042 A | | 1/1999 | Tomaru et al. |
| 5,920,758 A | | 7/1999 | Ohtsuki |
| 6,141,512 A | * | 10/2000 | Nagano et al. ............... 399/92 |
| 6,222,566 B1 | | 4/2001 | Takeyama et al. |
| 6,263,185 B1 | * | 7/2001 | Kato et al. .................. 399/405 |
| 6,266,498 B1 | | 7/2001 | Oda et al. |
| 6,356,722 B1 | | 3/2002 | Kida |

FOREIGN PATENT DOCUMENTS

| | | |
|---|---|---|
| JP | 1-191873 | 8/1989 |
| JP | 2-93554 | 4/1990 |
| JP | 04-31076 | 2/1992 |
| JP | 10-143031 | 5/1998 |
| JP | 11-052267 | 2/1999 |
| JP | 11-167232 | 6/1999 |
| JP | 11-278739 | 10/1999 |
| JP | 2000-95414 | 4/2000 |

* cited by examiner

Primary Examiner—Susan S. Y. Lee
(74) Attorney, Agent, or Firm—Foley & Lardner LLP

(57) ABSTRACT

An image forming apparatus of the present invention comprises an apparatus body having a document table portion on which a document is placed, a scanning unit provided inside the apparatus body to optically scan an image of the document placed on the document table portion, an image forming unit for forming a developer image on a photosensitive drum in accordance with the image information scanned by the scanning unit, a transfer charger for transferring the developer image formed by the image forming unit on a sheet, a fixing unit for fixing the developer image transferred by the transfer charger on the sheet, an ejecting roller for ejecting the sheet on which the developer image is fixed by the fixing unit to the outside, a sheet receiving unit provided below the scanning unit inside the apparatus body to receive the sheet ejected from the ejecting roller, and a blowing unit for blowing cool air to the sheet receiving unit along a lower surface part of the scanning unit.

53 Claims, 5 Drawing Sheets

IMAGE FORMING APPARATUS HAVING AN AIR OPENING IN A PAPER DISCHARGE AREA

The present application is a continuation of U.S. application Ser. No. 10/198,132, filed Jul. 19, 2002, now U.S. Pat. No. 6,611,667 which is a continuation of U.S. application Ser. No. 09/738,3, filed Dec. 18, 2000, now U.S. Pat. No. 6,438,339, the entire contents of which are incorporated herein by reference.

BACKGROUND OF THE INVENTION

The present invention relates to an image forming apparatus for use as, for example, an electrophotographic copier, for ejecting a sheet on which an image is transferred to a sheet receiving unit of an apparatus body.

An image forming apparatus such as an electrophotographic copier comprises a document table glass on which a document is to be placed, on an upper part of the apparatus body. An image scanner for optically scanning an image of the document is provided under the document table glass. The image information scanned by the image scanner is formed as an electrostatic latent image on a photosensitive drum. A developer is supplied to the electrostatic latent image by a developing unit and, therefore, the electrostatic latent image becomes a developer image. The developer image is transferred to a sheet, which is regarded as an image-transferred material. The sheet on which the developer image is transferred is conveyed by a conveyance mechanism. The transferred image is fixed on the sheet by a fixing unit during the conveyance and then the sheet is ejected.

Incidentally, the sheet is ejected to the outside of the apparatus body to simplify the structure of the apparatus body or to convey the sheet linearly.

On the other hand, recently, the apparatus allowing the sheet to be ejected to the sheet receiving unit provided inside the apparatus body while making the printed surface of the sheet face downward has been developed in order to maintain the secrecy of a document image printed on the sheet, to make the distance of conveyance of the sheet shorter, and to save the space. The sheet ejected to the sheet receiving unit is heated at the fixing unit before the ejection. The sheet therefore emits the heat inside the sheet receiving unit.

However, the image scanner is positioned at the uppermost part of the apparatus body when the function thereof is considered, and the sheet receiving unit is arranged immediately under the image scanner. Thus, the temperature of the image scanner is raised by the heat emitted from the sheets collected in the sheet receiving unit. As the image scanner comprises the optical components and the electronic components, the rise of the temperature causes a problem that a bad influence may be given to the performances of the optical components and the electronic components and thereby the image may be deteriorated.

To prevent the rise of the temperature of the image scanner, suction of outside air by use of a fan or the like to cool the image scanner is conceived.

However, the image scanner contains the optical components and is easily affected by dust and the like. For this reason, it is desirable not to provide an opening portion such as an air inlet on the image scanner, and it is not preferable to cool the image scanner by sucking the outside air into the image scanner.

BRIEF SUMMARY OF THE INVENTION

The present invention is accomplished in consideration of the above-described circumstances. The present invention aims to provide an image forming apparatus capable of preventing the rise of the temperature of the image scanner caused by the heat of the image-transferred members ejected to the sheet receiving unit, without sucking the outside air into the image scanner.

An image forming apparatus according to the present invention comprises an apparatus body having a document table portion on which a document is placed, scanning means provided inside the apparatus body, for optically scanning an image of the document placed on the document table portion, image forming means for forming a developer image on an image carrier in accordance with image information scanned by the scanning means, transfer means for transferring the developer image formed by the image forming means on an image-transferred member, an ejecting unit for ejecting the image-transferred member on which the developer image is transferred by the transfer means to the outside, a sheet receiving unit provided inside the apparatus body, for receiving the image-transferred member ejected from the ejecting unit, and blowing means for blowing cooling air to the sheet receiving unit.

Further, an image forming apparatus of the present invention comprises an apparatus body having a document table portion on which a document is placed, scanning means provided inside the apparatus body, for optically scanning an image of the document placed on the document table portion, image forming means for forming a developer image on an image carrier in accordance with image information scanned by the scanning means, transfer means for transferring the developer image formed by the image forming means on an image-transferred member, an ejecting unit for ejecting the image-transferred member on which the developer image is transferred by the transfer means to the outside, a sheet receiving unit provided at a lower part of the scanning means inside the apparatus body, for receiving the image-transferred member ejected from the ejecting unit, and blowing means for blowing cooling air to the sheet receiving unit along a lower surface part of the scanning means.

Moreover, an image forming apparatus of the present invention comprises an apparatus body having a document table portion on which a document is placed, scanning means provided inside the apparatus body, for optically scanning an image of the document placed on the document table portion, latent image forming means for forming an electrostatic latent image on an image carrier in accordance with image information scanned by the scanning means, developing means for supplying a developer to the electrostatic latent image formed by the electrostatic latent image forming means to form a developer image, transfer means for transferring the developer image formed by the developing means on an image-transferred member, fixing means for fixing the developer image transferred by the transfer means on the image-transferred member, an ejecting unit for ejecting the image-fixed member on which the developer image is fixed by the fixing means, a sheet receiving unit provided at a lower part of the scanning means inside the apparatus body, for receiving the image-transferred member ejected from the ejecting unit, and blowing means for blowing cooling air to the sheet receiving unit along a lower surface part of the scanning means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the drawings.

Figure 1:
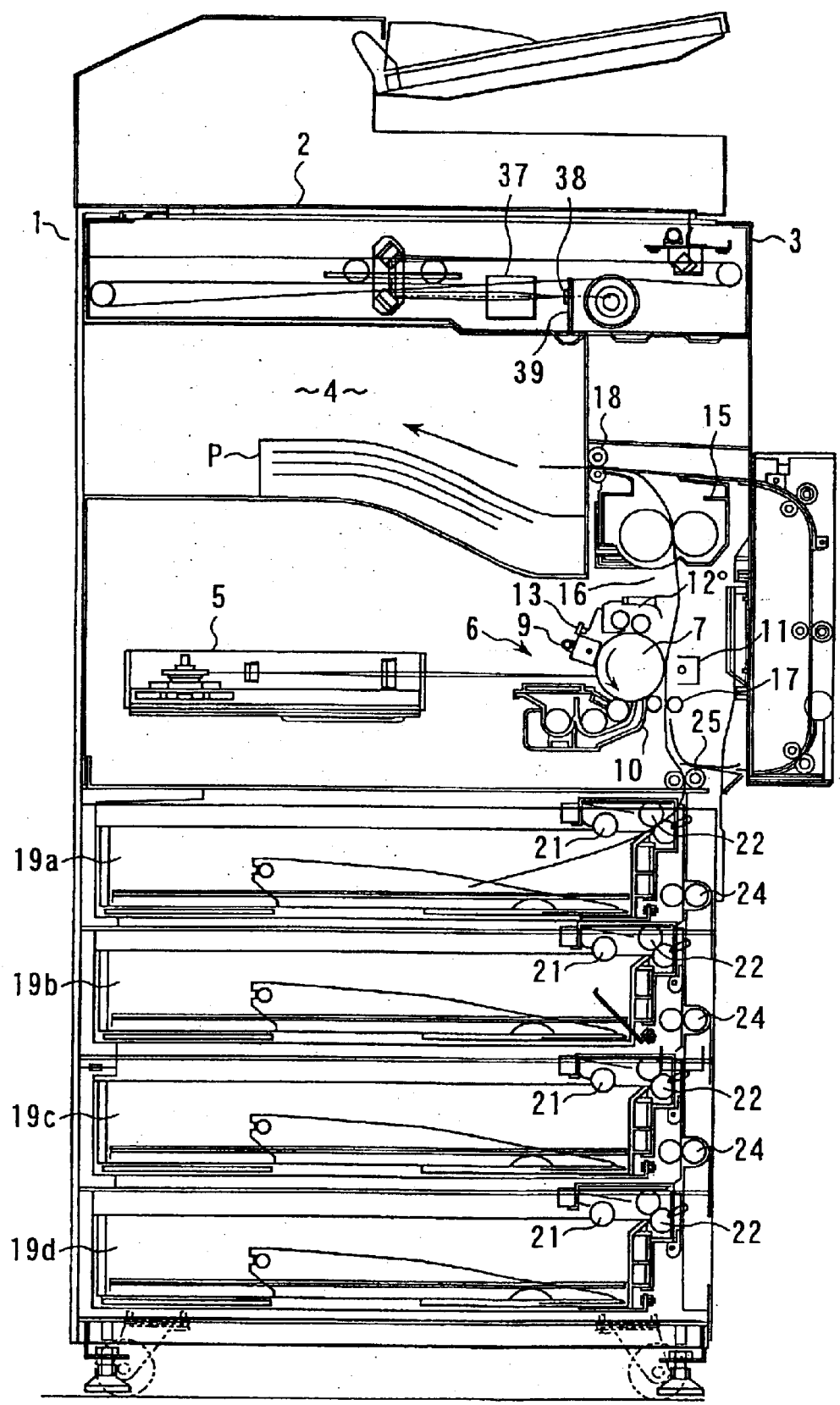
FIG. 1 is a view showing an internal structure of an electrophotographic copier according to an embodiment of the present invention.

FIG. 1 is a view showing a structure of an electrophotographic copier according to an embodiment of the present invention.

In the figure, reference numeral 1 denotes a main body of an apparatus. A document table 2 on which a document is to be placed is provided on an upper part of the apparatus body 1. An optical image scanner 3 for scanning an image on a document is provided under the document table 2. A sheet-receiving unit 4 for receiving a sheet P as an image-transferred member, which is ejected to the outside after an image is formed on the member, is provided under the optical image scanner 3. An exposure unit 5 for forming an image on a photosensitive drum 7 to be described later in accordance with the image information is provided under the sheet-receiving unit 4.

An image formation unit 6 serving as image forming means is provided beside the exposure unit 5. The image formation unit 6 comprises the photosensitive drum 7, which can be freely rotated in a direction indicated by an arrow. An electrifier 9, a developing unit 10, a transfer charger 11, a cleaning device 12 and a destaticizer 13 are provided in order around the photosensitive drum 7 in the rotational direction of the photosensitive drum 7.

The electrifier 9 uniformly electrifies the surface of the photosensitive drum 7. The developing unit 10 supplies a developer to an electrostatic latent image formed on the photosensitive drum 7 and develops the image. The transfer charger 11 transfers the developer image formed on the photosensitive drum 7 on the sheet P. The cleaning device 12 removes the developer remaining on the photosensitive drum 7 after the transfer of the developer image. The destaticizer 13 removes the electric potential remaining on the photosensitive drum 7.

A fixing unit 15 for fixing the image on the sheet P is provided above the image formation unit 6. A sheet conveyance path 16 in which the sheet P is conveyed is provided between the fixing unit 15 and the image formation unit 6. An alignment roller 17 for aligning the sheet P fed to the image formation unit 6 is provided under the sheet conveyance path 16. An ejecting roller 18 serving as an ejecting unit for ejecting the sheet P is provided over the sheet conveyance path 16. The sheet P ejected from the ejecting roller 18 is fed into the sheet receiving unit 4 while the image-printed surface faces downward to maintain the secrecy.

On the other hand, paper feed cassettes 19a to 19d for containing the Sheets of various sizes are provided on a plurality of stages on a lower part inside the apparatus body 1. The sheets inside the paper feed cassettes 19a to 19d are picked up by the rotation of pickup rollers 21. The sheets are separated one by one and fed by separating rollers 22.

A vertical conveyance path 23 is provided along the sheet feeding direction of the paper feed cassettes 19a to 19d on the plural stages. Conveying roller pairs 24 are provided in the vertical conveyance path 23 while having a predetermined distance therebetween in the vertical direction. A conveying roller pair 25 for conveying the sheet P toward the alignment roller 17 is provided on the upper part of the vertical conveyance path 23.

Figure 2:
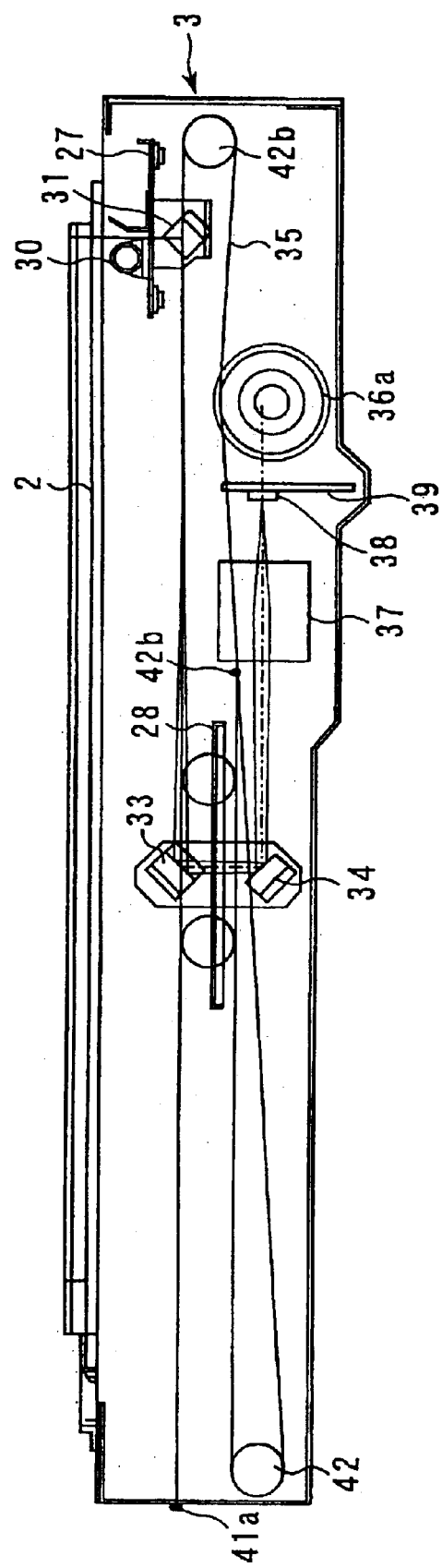
FIG. 2 is a view showing a structure of an optical image scanner.

FIG. 2 shows a structure of the image scanner 3.

The image scanner 3 comprises first and second carriages 27 and 28 that are made to run along the document table 2. A light source 30 and a first mirror 31 are mounted on the first carriage 27, and second and third mirrors 33 and 34 are mounted on the second carriage 28. An image-forming lens 37, a photoelectric conversion device 38 (hereinafter called a CCD) for receiving the reflected light and converting the image information into an electric signal, and a driver circuit 39 of the CCD 38 are aligned in the path of the light reflected by the third mirror 34.

A drive wire 35 is bridged between the first and second carriages 27 and 28. Both end parts of the drive wire 35 are fixed at fixing portions 41a and 41b. A middle part thereof is bridged on fixing pulleys 42a and 42b, and a driving pulley 36a of the drive motor.

The drive wire 35 is wound in the normal or opposite direction by the normal or opposite rotation of the drive pulley 36a and thereby the first and second carriages 27 and 28 are made to run along the document table 2 in the normal or opposite direction.

Next, the image forming operation will be explained.

When a copy button (not shown) is pushed down, the first and second carriages 27 and 28 start to move from a home position and scanning the document is started. Thus, the light emitted from the light source 30 is irradiated to the document placed on the document table 2. The light reflected from the document is received by the CCD 38 via the first to third mirrors 31, 33 and 34, and the lens 37. The light image data is converted by the reception of the light from an analog signal to a digital signal, which is subjected to the correction processing required for images. After that, various kinds of operations (for example, scaling, trimming, and the like) are carried out and the image information signal is transmitted to the exposure unit 5.

On the other hand, at this time, the surface of the photosensitive drum 7 is uniformly electrified by the electrifier 9 and scanned by the exposure unit 5 using the laser beam corresponding to the image information, so that the electrostatic latent image is written on the surface of the photosensitive drum 7. The electrostatic latent image is developed by the developer supplied from the developing unit 10 so as to be a developer image. The developer image is transferred onto the sheet by the transfer charger 11. The sheet on which the developer image is transferred is peeled off from the photosensitive drum 7 because of the elasticity of the sheet and conveyed to the fixing unit 15. The developer image on the sheet is heated and fixed thereon by the fixing unit 15. After the fixation, the sheet is ejected and collected from the ejecting roller 18 to the sheet receiving unit 4 while the image-transferred surface faces downward. After the transfer of the developer image, the developer remaining on the photosensitive drum 7 is scraped and removed therefrom by the cleaning unit 12. Then, the surface of the photosensitive drum 7 is destaticized by the destaticizing lamp 13 and the operation proceeds to a next image formation cycle.

Figure 3:
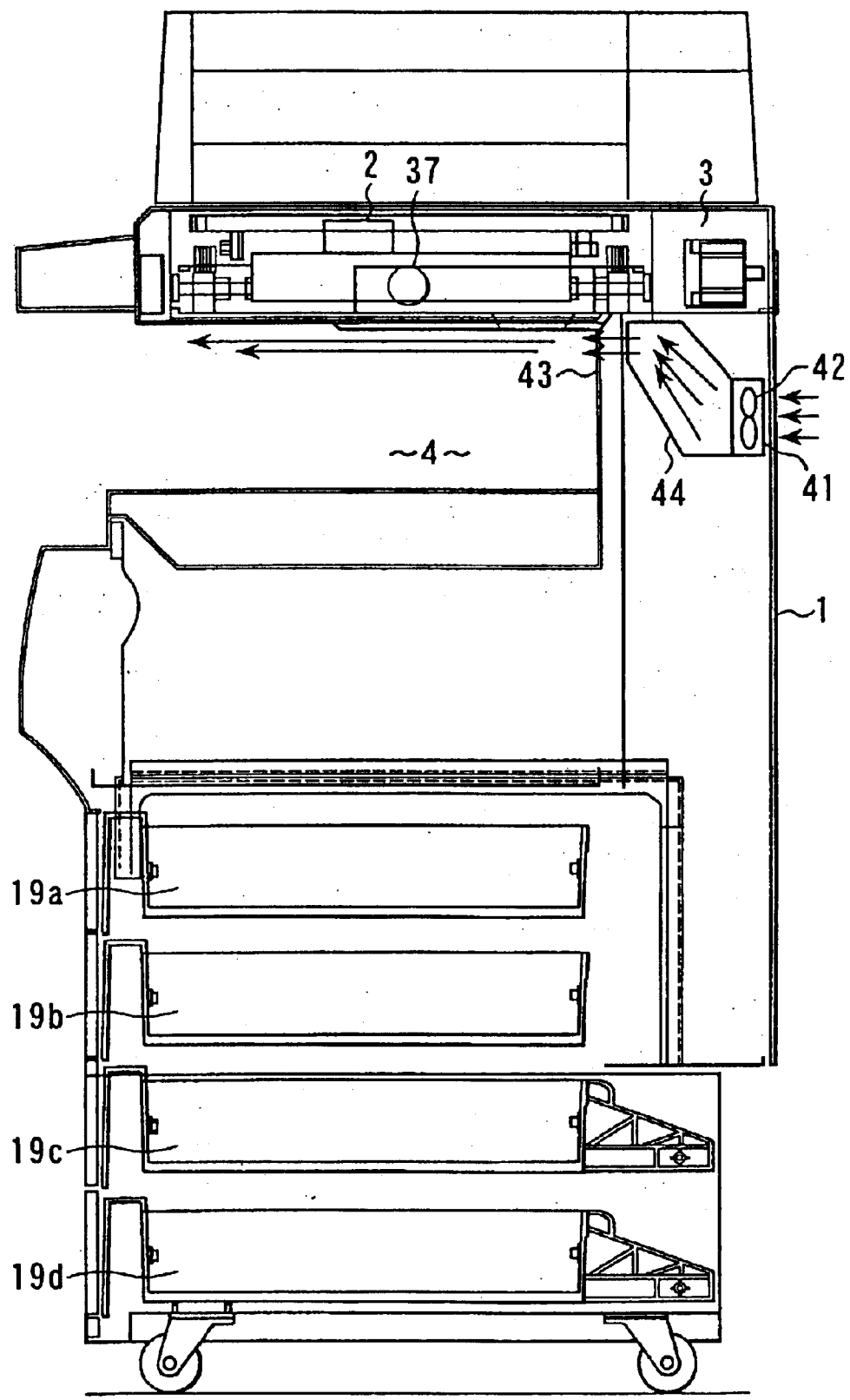
FIG. 3 is a side view showing an air blower provided inside a main body of the copier.

FIG. 3 shows a blower fan 42 serving as blowing means, which is the gist of the present invention.

Figure 4:
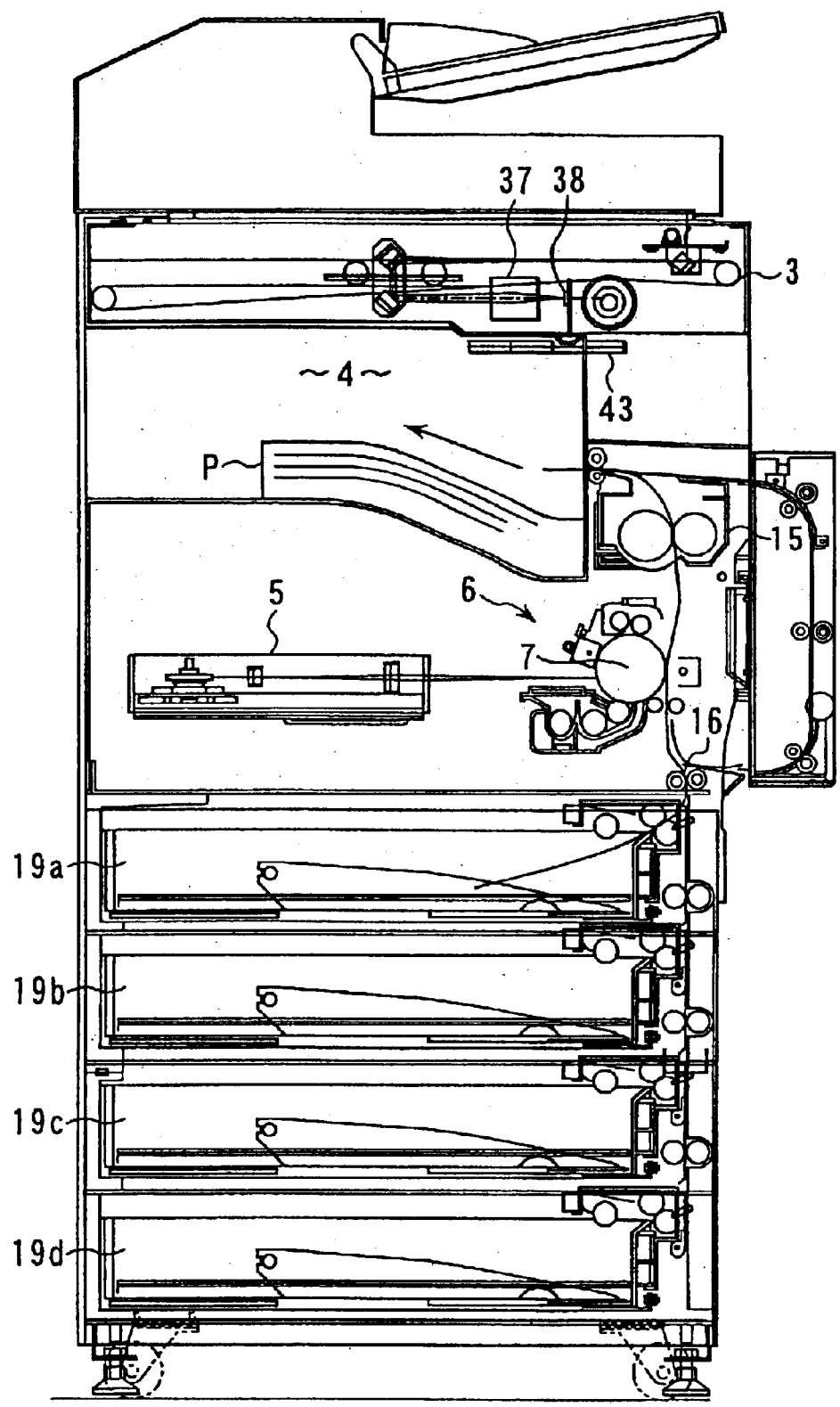
FIG. 4 is a front view showing an air outlet of the air blower.
Figure 5:
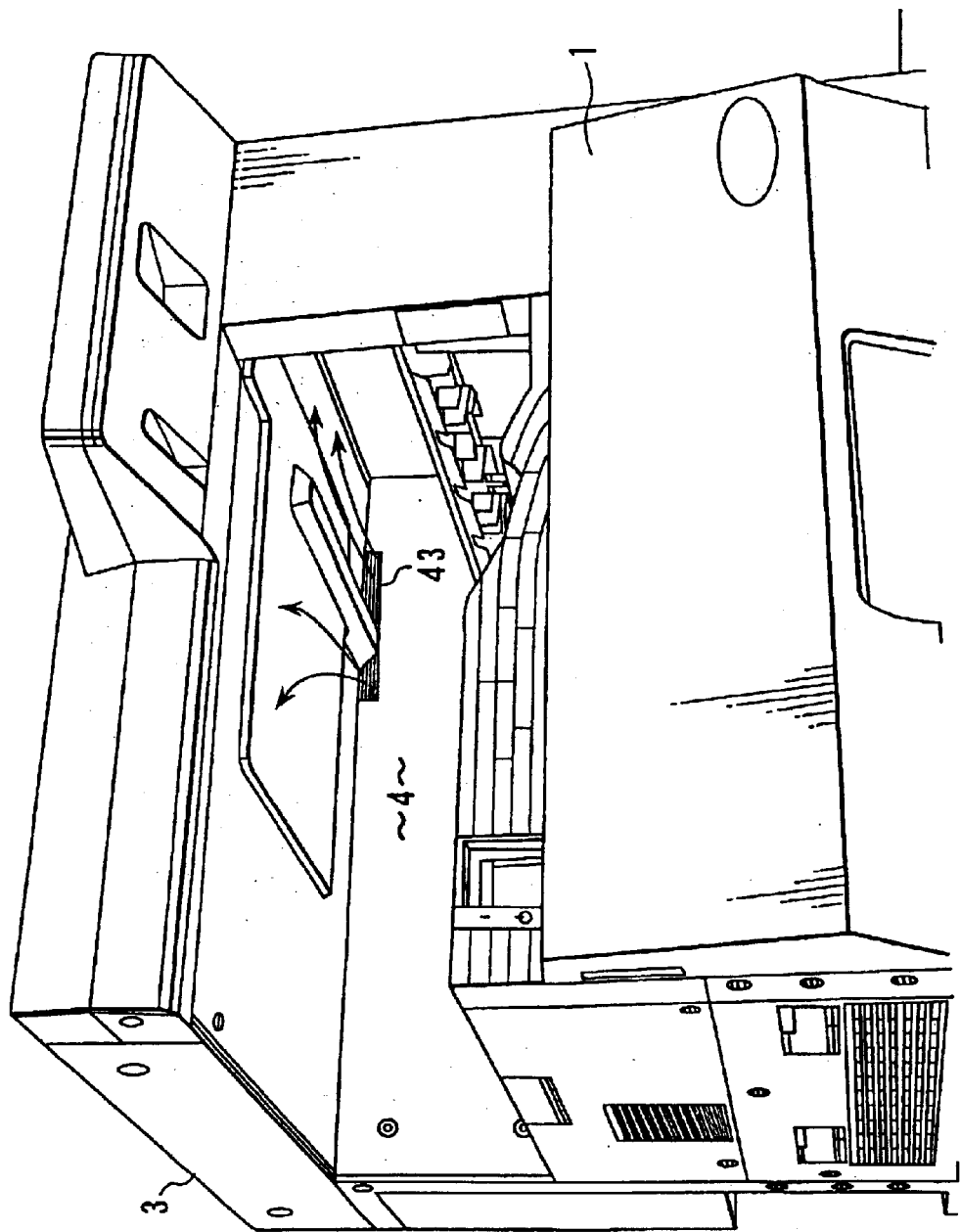
FIG. 5 is a perspective view showing the air outlet of the air blower.

The blower fan 42 is provided at an upper part on the back side inside the apparatus body 1 so as to face an air inlet 41 provided on the back of the apparatus body 1. An air outlet 43 is formed at an upper part of the back of the sheet receiving unit 4 as shown in FIGS. 4 and 5. The air outlet 43 and the blower fan 42 communicate with one another through an air duct 44. The air outlet 43 is positioned in the vicinity of optical components such as the CCD 38.

Upon the image formation, the blower fan 42 is rotated and the outside air is sucked through the air inlet 41. The sucked air is blown out from the air outlet 43 through the air duct 44 and supplied to the sheet receiving unit 4 along the lower surface of the image scanner 3.

Incidentally, as the sheets ejected by the ejecting roller 18 are heated by the fixing unit 15, the sheets emit heat after ejected. The image scanner 3 is provided above the sheet receiving unit 4 and the temperature of the image scanner 3 is made to rise by the heat emitted from the sheets collected in the sheet receiving unit 4. When the temperature of the image scanner 3 is raised, the performances of the lens 37 and the CCD 38 serving as the optical components may be deteriorated by the heat.

As described above, however, in the present invention, cool air is introduced into the sheet receiving unit 4 along the lower surface of the image scanner 3 and, therefore, it is possible to insulate the heat transmitted to the lens 37 and the CCD 38 serving as the optical components and restrict the rise of the temperature of the image scanner 3 or the lens 37, CCD 38 and the like provided in the image scanner 3.

Accordingly, it is possible to certainly prevent the deterioration of the image scanning performance caused by the rise of the temperature of the image scanner 3 or the lens 37, CCD 38 and the like provided in the image scanner 3.

The outlet 43 of the cool air is positioned in the vicinity of the optical components such as the CCD. Therefore, the cool air is concentrated on the vicinity of the optical components and it is possible to cool the optical components more effectively.

Moreover, as the cool air is not introduced directly into the image scanner 3, dust or the like is not applied to the optical components inside the image scanner 3 or the like, image noise caused by the dust is hardly generated and the image scanning performance can be preferably maintained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   a first unit including a scanner which scans light on a document placed on a document table portion, and a photoelectric conversion device which receives the light reflected from the document by the scanning by the scanner and optically scans image information of the document;
   a second unit including an exposure unit which forms an electrostatic latent image by irradiating a laser beam on an image carrier in accordance with the image information scanned by the photoelectric conversion device; an image formation unit which forms a developer image by supplying a developing agent to the electrostatic latent image formed by the exposure unit; a transfer charger which transfers the developer image formed by the image formation unit onto an image-transferred member; an ejecting roller which ejects the image-transferred member onto which the developer image is transferred by the transfer charger to the outside; and a sheet receiving unit which receives the image-transferred member ejected from the ejecting roller, wherein the scanner is located above the ejecting roller; and
   a first air opening, which allows air to travel therethrough, located on a surface out of a plurality of surfaces which define a space formed between the first and second units,
   wherein the first air opening is located above a location at which the ejecting roller ejects the image-transferred member.

2. An image forming apparatus according to claim 1, further comprising a blower fan.

3. An image forming apparatus according to claim 2, wherein the blower fan is located on a rear side of the image forming apparatus at a position in the image forming apparatus relatively lower than a position of the first air opening.

4. An image forming apparatus according to claim 3, wherein the second unit further includes a fixing unit, and
   wherein at least a portion of the blower fan is relatively above the fixing unit.

5. An image forming apparatus according to claim 4, wherein the blower fan blows air and is communicatively coupled to the first air opening.

6. An image forming apparatus according to claim 4, wherein the first air opening is wider than taller.

7. An image forming apparatus according to claim 6, wherein the first air opening comprises multiple slits.

8. An image forming apparatus according to claim 1, further comprising a second air opening.

9. An image forming apparatus according to claim 8, wherein the second air opening is located on a surface opposite the first air opening.

10. An image forming apparatus according to claim 9, wherein the second air opening is located at a position lower than a position of the first air opening.

11. An image forming apparatus according to claim 1, wherein the first air opening is adjacent to the scanner, the image forming apparatus further comprising:
    a second air opening opposite the first air opening,
    wherein air travels outward from the second air opening during a copy operation.

12. An image forming apparatus according to claim 11, further comprising:
    a blower fan, which blows air, located on a rear side of the image forming apparatus at a position in the apparatus relatively lower than a position of the first air opening; and
    a fixing unit, wherein at least a portion of the blower fan is relatively above the fixing unit.

13. An image forming apparatus according to claim 1, wherein the first air opening faces a direction perpendicular to a direction in which the ejecting roller ejects the image-transferred member.

14. An image forming apparatus according to claim 1, further comprising a blower fan, which blows air, located on a rear side of the image forming apparatus at a position in the apparatus relatively lower than a position of the first air opening; and a fixing unit, wherein at lest a portion of the blower fan is relatively above the fixing unit.

15. An image forming apparatus comprising:

a scanner which scans light on a document placed on a document table portion;

a photoelectric conversion device which receives the light reflected from the document by the scanning by the scanner and optically scans image information of the document;

an exposure unit which forms an electrostatic latent image by irradiating a laser beam on an image carrier in accordance with the image information scanned by the photoelectric conversion device;

an image formation unit which forms a developer image by supplying a developing agent to the electrostatic latent image formed by the exposure unit;

a transfer charger which transfers the developer image formed by the image formation unit onto an image-transferred;

an ejecting roller which ejects the image-transferred member onto which the developer image is transferred by the transfer charger to the outside, wherein the scanner is located above the ejecting roller;

a sheet receiving unit which receives the image-transferred member ejected from the ejecting roller;

at least one oven surface out of a plurality of surfaces which define a space formed between the scanner and the sheer receiving unit;

a first air opening, which allows air to travel therethrough, located on a surface out of the plurality of surfaces above a location at which the ejecting roller ejects the image-transferred member; and a blower fan located on a rear side of the image forming apparatus at a position in the image forming apparatus relatively lower than a position of the first air opening.

16. An image forming apparatus according to claim 15, further comprising a fixing unit, and wherein at least a portion of the blower fan is relatively above the fixing unit.

17. An image forming apparatus according to claim 16, wherein the blower fan blows air and is communicatively coupled to the first air opening.

18. An image forming apparatus according to claim 16, wherein the first air opening is wider than taller.

19. An image forming apparatus according to claim 18, wherein the first air opening comprises multiple slits.

20. An image forming apparatus according to claim 15, further comprising a second air opening.

21. An image forming apparatus according to claim 20, wherein the second air opening is located on surface opposite the first air opening.

22. An image forming apparatus according to claim 21, wherein the second air opening is located at a position lower than a position of the first air opening.

23. An image forming apparatus according to claim 22, further comprising a fixing unit, wherein at least a portion of the blower fan is relatively above the fixing unit.

24. An image forming apparatus according to claim 15, wherein the first air opening is adjacent to the scanner, the image forming apparatus further comprising:

a second air opening opposite the first air opening, wherein air travels outward from the second air opening during a copy operation.

25. An image forming apparatus according to claim 24, further comprising:

a fixing unit, wherein at least a portion of the blower fan is relatively above the fixing unit.

26. An image forming apparatus according to claim 25, wherein the blower fan sucks air into the image forming apparatus.

27. An image forming apparatus comprising:

a scanning means for optically scanning an image of a document placed on a document table portion;

an image forming means for forming a developer image on an image carrier in accordance with the image scanned by the scanning means;

a transfer means for transferring the developer image formed by the image forming means onto an image-transferred member;

an ejecting means for ejecting the image-transferred member onto which the developer image is transferred by the transfer means to the outside, wherein the scanning means is located above the ejecting means;

a sheet receiving means for receiving the image-transferred member ejected from the ejecting means;

at least one open surface out of a plurality of surfaces which define a space formed between the scanning means and the sheet receiving means;

a first air opening, which allows air to travel therethrough, located on a surface out of the plurality of surfaces above a location at which the ejecting means ejects the image-transferred member; and blowing means for blowing air located on a rear side of the image forming apparatus at a position in the image forming apparatus relatively lower than a position of the first air opening.

28. An image forming apparatus according to claim 27, further comprising a fixing means for fixing the developer image to the image-transferred member, and wherein at least a portion of the blowing means is relatively above the fixing means.

29. An image forming apparatus according to claim 28, wherein the blowing means blows air and is communicatively coupled to the first air opening.

30. An image forming apparatus according to claim 28, wherein the first air opening is wider than taller.

31. An image forming apparatus according to claim 30, wherein the first air opening comprises multiple slits.

32. An image forming apparatus according to claim 27, further comprising a second air opening.

33. An image forming apparatus according claim 32, wherein the second air opening is located on a surface opposite the first air opening.

34. An image forming apparatus according to claim 33, wherein the second air opening is located at a position lower than a position of the first air opening.

35. An image forming apparatus according to claim 27, wherein the first air opening is adjacent to the scanning means, the image forming apparatus further comprising:

a second air opening opposite the first air opening, wherein air travels outward from the second air opening during a copy operation.

36. An image forming apparatus according to claim 35, further comprising:

a fixing means for fixing the developer image to the image-transferred member, wherein at least a portion of the blowing means is relatively above the fixing means.

37. An image forming apparatus according to claim 36, wherein the blowing means sucks air into image forming apparatus.

38. An image forming apparatus according to claim 27, further comprising a fixing means for fixing the developer image to the image-transferred member, wherein at least a portion of the blowing means is relatively above the fixing means.

39. A method of operating an image forming apparatus comprising:

providing a scanner inside an apparatus body;

providing a sheet receiving unit spaced relatively below the scanner;

providing at least one open surface out of a plurality of surfaces which define a space formed between the scanner and the sheet receiving unit;

providing a first air opening on one of the plurality of surfaces;

scanning an image of a document by the scanner to provide a scanned image;

forming a developer image on an image carrier in accordance with the scanned image;

transferring the developer image onto an image-transferred member;

ejecting the image-transferred member with an ejecting roller, wherein the scanner is located above the ejecting roller;

receiving the ejected image-transferred member by the sheet receiving unit; and allowing air to travel through the first air opening, wherein the first air opening is positioned above a location at which the image-transferred member is ejected.

40. A method according to claim 39, further comprising blowing air with a blower fan.

41. A method according to claim 40, wherein the blower fan is located on a rear side of the image forming apparatus at a position in the image forming apparatus relatively lower than a position of the first air opening.

42. A method according to claim 41, further comprising fixing the developer image to the image-transferred member with a fixing unit, and wherein at least a portion or the blower fan is relatively above the fixing unit.

43. A method according to claim 42, wherein the blower fan blows air and is communicatively coupled to the first air opening.

44. A method according to claim 42, wherein the first air opening is wider than taller.

45. A method according to claim 44, wherein the first air opening comprises multiple slits.

46. A method according to claim 39, further comprising permitting air flow between the first air opening and a second air opening communicatively coupled to the first air opening.

47. A method according to claim 46, wherein the second air opening is located on a surface opposite the first air opening.

48. A method according to claim 47, wherein the second air opening is located at a position lower than a position of the first air opening.

49. A method according to claim 39, further comprising permitting air to travel outward from a second air opening during a copy operation, wherein the first air opening is adjacent to the scanner, and wherein the second air opening is located opposite the first air opening.

50. A method according to claim 49, further comprising:

blowing air with a blower fan located on a rear side of the image forming apparatus at a position in the apparatus relatively lower than a position of the first air opening; and fixing the developer image to the image-transferred member with a fixing unit, wherein at least a portion of the blower fan is relatively above the fixing unit.

51. A method according to claim 50, further comprising sucking air into the image forming apparatus with the blower fan.

52. A method according to claim 39, wherein the first air opening faces a direction perpendicular to a direction in which the ejecting roller ejects the image-transferred member.

53. A method according to claim 39, further comprising blowing air with a blower fan located on a rear side of the image forming apparatus at a position in the apparatus relatively lower than a position of the first air opening; and fixing the developer image the image-transferred member with a fixing unit, wherein at least a portion of the blower fan is relatively above the fixing unit.

* * * * *